Feb. 27, 1934.  H. G. WILLIAMS  1,948,554
LICENSE PLATE LOCK BAR
Filed June 18, 1931
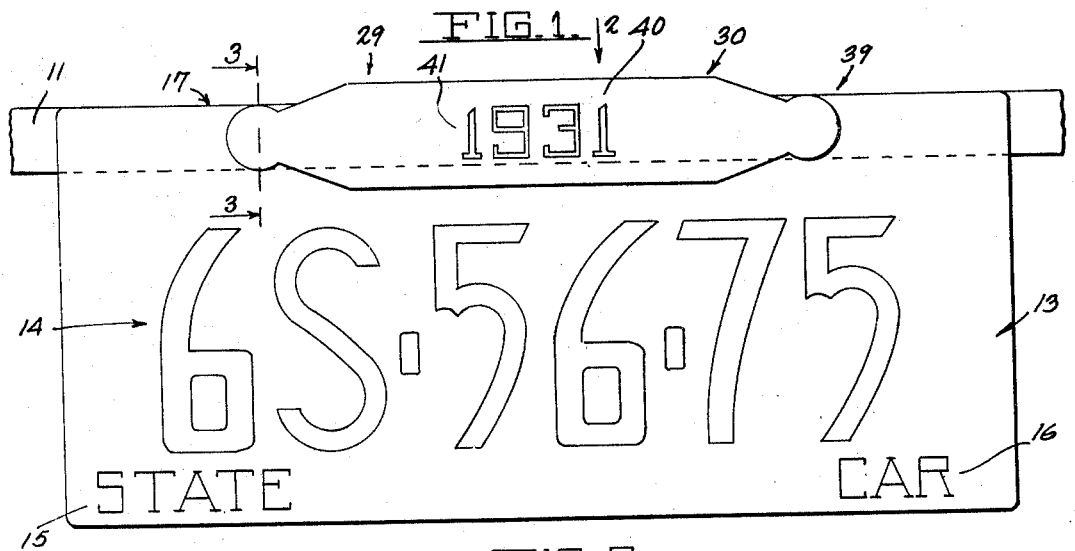
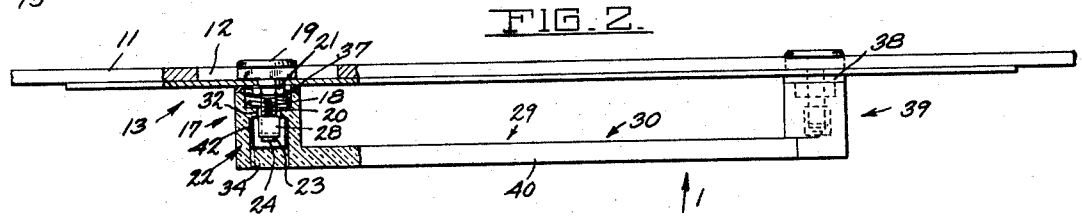
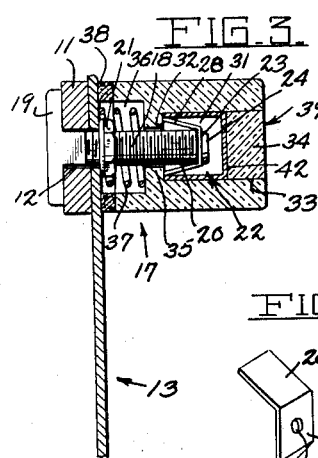
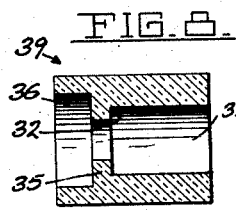
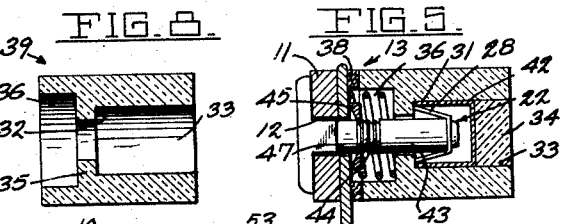
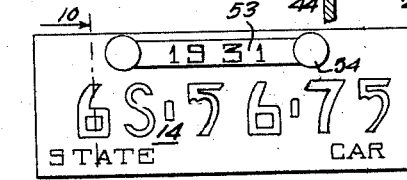
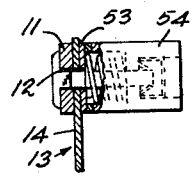
INVENTOR.
H. G. Williams
BY Hazard and Miller
ATTORNEYS.

Patented Feb. 27, 1934

1,948,554

UNITED STATES PATENT OFFICE 1,948,554

LICENSE PLATE LOCK BAR

Harrison Graham Williams, Los Angeles, Calif.

Application June 18, 1931. Serial No. 545,173

24 Claims. (Cl. 40—2.2)

My invention relates to a type of fastening for a license plate for vehicles, and by the use of my invention I comprehend a change in the system of registering automobiles and keeping track of such registration. For instance: by use of my plate and lock bar, as long as a vehicle is registered in the same State it carries the same license number, this license number also preferably has the State in which the car is registered and also the name of the car, that is, the name of the make; but each year a new lock bar is issued, the old lock bar being destroyed, such lock bar being of a character that the bar cannot be removed without breakage of such bar and, hence, it is impossible to remove the license plate from the vehicle without breaking the bar. In addition, by my construction, when the car is scrapped or destroyed the license plates are returned to the registration bureau, and to prevent large numbers being necessary the same number may be reissued.

Another feature of my lock bar construction and system is that it makes it difficult, if not impossible, to shift license plates from one vehicle to another without detection. As above mentioned, to remove a license plate the bar must be broken and a new bar substituted and if, in addition to the license number the plate carries the name of the State and the name of the car the shifting of the plates is still more difficult. Thus, it will be a more simple matter to detect stolen cars than under the present system and to apprehend drivers of cars having license numbers wanted by the police.

In regard to my mechanical construction an object and feature of my invention is in the use of an attaching bolt or other device for securing the license plate to a bar or other frame structure on the vehicle and also the application of a lock bar to these bolts, the manner of attachment requiring the breaking of the bar for removal of the plate, and as the bars may be issued each year having the year marked thereon the old bar must be broken and the new bar installed on the same bolts.

A further detailed object of my invention is making the lock bar preferably of frangible material, this having a recessed socket which may engage a spring detent which is mounted on the bolt.

Another detailed feature of my invention is making the recessed socket so that it is closed on the outside and only has one single opening for the insertion of the end of the bolt. The bolt when secured in the socket, secures the lock bar to the vehicle and also to the license plate, and the structure forming the socket cannot be removed without breaking it into various pieces.

My invention also comprehends identification devices for automobiles in which the license plate will have a number, the name of the make of the car, and the name of the State or Territory issuing such plate. This remains on the vehicle so long as it is registered under the State or Territory issuing such plate. The lock or indicia bearing bar will, however, be changed every year, and as these bars or the hubs thereof, must be broken to change the license plate it makes it difficult to change such plates.

My invention is illustrated in connection with the accompanying drawing, in which:

Fig. 1 is an elevation taken in the direction of the arrow 1 of Fig. 2;

Fig. 2 is a plan partly broken away taken in the direction of the arrow 2 of Fig. 1;

Fig. 3 is a detailed vertical section on the line 3—3 of Fig. 1 in the direction of the arrows;

Fig. 4 is a perspective view of the spring detent shown in Fig. 3;

Fig. 5 is a view similar to Fig. 3 showing another type of locking bolt;

Fig. 6 is a detail of the locking washer of Fig. 5;

Fig. 7 is a view similar to Figs. 3 and 5 of a still further modification of the locking detent;

Fig. 8 is a detailed section through one of the hubs of the indicia bearing bar, illustrating the manner of construction;

Fig. 9 is a front elevation of a modified type of construction using attachment hubs separate from the indicia bearing bar;

Fig. 10 is a vertical section on the line 10—10 of Fig. 9 in the direction of the arrows.

In the construction illustrated, I show a frame bar 11 which is part of a vehicle and is used for the support of the license plate. This bar has a plurality of perforations 12 or slots to accommodate the attaching bolts as hereinunder detailed. The license plate 13 is indicated as having a license number 14, the name of the State or other Territory issuing licenses 15, and also the name of the car 16; by the name of the car is meant the name of the make; and as there are comparatively few automobile makers the name can readily be placed on the license plate. As above mentioned, these plates are intended to last the life of the car or as long as such car is registered in the same State or Territory.

The locking bolt assembly 17 has a bolt 18 having a head 19. The head at least is preferably made of very hard material which would make sawing or cutting difficult. The bolt has a threaded section 20 on which is threaded the nut 21 which clamps the license plate 13 to the bar 11. A spring detent 22 is illustrated as having a flat section 23 to be engaged by a riveted head 24. This, however, may be secured by some other type of permanent fastening. The detent is, therefore, illustrated as having a flat central portion 23 with a perforation 27 therethrough to accommodate the shank of the bolt from which the riveted head is made. This detent also has laterally extending resilient or spring ends 28.

The locking bar assembly designated 29 is indicated having a rod or bar section 30 with a recessed socket 31 formed therein; such socket has a shoulder 32 and is made by having an open socket structure 33 in which is fitted and welded a plug 34. There is a contracted neck 35 leading into the socket from the back of the bar and at the back there is also an enlarged recess 36 to accommodate the compression spring 37. This compression spring is fitted in place after the bolt is assembled and when it is desired to attach the yearly license bar. A suitable washer 38 which is preferably made of material which does not readily deteriorate with heat and wear is fitted between plate 13 and the hub structure 39 at each end of the bar, the bar having a central section 40 between the hub ends in which is marked the year 41 for which the current bar is issued. To protect the recessed socket 31 I utilize a lining cup 42.

In the use of the attaching bolt of Fig. 3 the bar is made, preferably, of frangible material, such as glass, but it may be made of metal, and the recessed socket is made in the form illustrated in Fig. 8. The plug 34 is then fitted and welded or if made of glass glazed in place by hot glazing which fuses the plug and the cup portion of the bar. When the bar is forced against the bolts the recesses 36 are centered on the bolts and pressure is exerted on the license plate. This pressure causes a squeezing inwardly of the spring ends 28 of the detent 22, allowing these ends to squeeze through the opening 35 in the hub of the bar. When the spring detent is in the recessed socket 31, the spring ends will expand and engage the shoulder 32 and thus prevent removal of the license bar.

In the construction of Figs. 5 and 6 the bolt 43 has a series of annular V-shaped grooves 44, which grooves are engaged by a washer 45 having a series of radial splits 46, the central portion 47 of the washer having a knife-like edge engaging these grooves and thus holding the bolt in secure position on the plate and attaching the plate to the bar 11.

In the construction of Fig. 7 I illustrate a bolt 48 which may be of the type shown in Fig. 5 or that of Fig. 3. This bolt has a transverse slot 49 with a pair of detent fingers 50 pivoted therein at 51. These detent fingers are pressed apart by a spring 52. The hub section of the bar having the socket recess is pressed on this bolt end and squeezes the finger-like detents inwardly, pressing the spring 52 until these detents fit in the socket recess 31 when they are spread apart by the spring, thus holding the bar firmly attached to the license plate and to the frame supporting the plate.

In the construction of Figs. 9 and 10 I employ the same type of license plate 13 but the indicia bearing bar 53 is a separate bar, and attached to the bolts there are locking hubs 54. These hubs may be circular on the outside and internally they have each a recessed socket formed similar to that shown in the hubs of Figs. 3, 5, and 7. It is obvious that the license plate may be secured to the bolt and, hence, to the vehicle by a construction similar to Figs. 3, 5, and 7, and the locking hub 54 attached to the bolt in a similar manner and thereby secure the indicia bearing bar 53 in place. However, in the construction illustrated in Figs. 9 and 10, the nuts or the like for securing the license plate to the bar 11 are omitted and the securing device for attaching the indicia bearing bar to the bolt is the sole means for securing both the license plate and the indicia bearing bar to the bar 11 of the vehicle. The enclosed spring in the large recess 36 gives, in effect, a resilient mounting for the attachment hubs and with the washer will prevent rattling. These hub structures are only issued to authorized persons for placement on vehicles and, therefore, should a person break one of these he would have to go to an authorized official to obtain another. This would prevent interchanging license plates and the indicia bearing bars. Also, with my system when a dealer sells a car he would put the license plate on and attach such plate with the breakable hubs. Then when the purchaser receives the indicia bearing bar from the governmental bureau, the temporary hubs can be broken and the separate strip or bar of Fig. 9 used with new hubs, or the combined indicia bearing bar with its integral hubs utilized.

It is obvious that the plate 53 secured in position by the breakable hubs 54 may be used as a permanent structure, in which case the destruction of the hubs will show that either the license plate or the indicia bearing bar had been tampered with.

From the above description, together with the drawing, it will be seen that my invention comprehends and includes not only the indicia bearing bar and the means for securing this in place but the use of a license plate with a license number which in the State of registration is used on the car without change. Also, on the license plate as a means of identification there is required to be the name of the make of the car, thus a license plate for one make of car could not be used on another make of car. In addition, the State or Territory of issue of the license plate could also be designated on such plate. Hence, the indicia bearing bar with the year of the current license is the only part that need be changed each year. License plates which had been manufactured one year could, therefore, be carried over to the next year and the indicia bearing bars, being comparatively cheap, would be renewable each year.

With my system of identification numbers and names of cars and the bar indicating the year, it is believed it would be easier for police or other authorities to identify cars and they could concentrate on noting if the indicia bearing bars or the hubs thereof had been broken and, if so, they could investigate and check up on the license number of the car.

It is, likewise, believed that by the use of my invention it would be more difficult for automobile thieves to operate. At the present time it is a common practice for such thieves to take old plates; of the current year, however; stealing these from other cars or obtaining them from junked cars, then when stealing a car they substitute a set of these license plates and also, probably, change the serial number of the engine of the car. It is also believed that by my invention the use of automobiles in a robbery would be more difficult. Quite frequently in such robberies, using automobiles, the thieves after proceeding in the car away from the site of the crime will change the license plates and perhaps do this several times to avoid detection. With my type of devices it will be more difficult to change license plates.

As it is my intention that the license plate be carried by the automobile from the time this is delivered until it is scrapped, it may be found desirable to have the manufacturer permanently secure the license plate to the vehicle at the time when he disposes of same. Then the indicia bearing bar could be attached and detached from this permanent license plate.

Various changes may be made in the features of the invention without departing from the spirit or scope thereof as defined by the appended claims.

I claim:

1. In a device as described, the combination of a license plate, a plurality of bolts connected thereto and adapted for detachably securing the plate to a supporting frame, an indicia bearing bar having a plurality of hubs, one for each bolt, and an interengaging attachment means between the hub and the bolt to attach the hub to the bolt, and being disconnectible only after breakage of the hub, and said attachment means preventing detaching of the bolt from the license plate.

2. In a device as described, the combination of a license plate having a plurality of bolts detachably connected thereto adapted for securing the plate to a supporting frame, an indicia bearing bar having a plurality of breakable hubs, each with a recessed socket, each socket engaging a bolt, and an expansible holding device on the bolt to non-removably engage in said socket, said hubs preventing removal of the bolts from the license plate, and the hubs requiring breakage for disconnection from the bolt, said bolts on disconnection of the hubs being adapted for mounting a replacement bar.

3. In a device as claimed in claim 2, the holding means on the bolts comprising expansible detents each adapted to engage a shoulder in the recessed socket of each hub.

4. In a device as described, the combination of a license plate, a plurality of bolts detachably connected thereto and adapted for securing the plate to a supporting frame, an indicia bearing bar having a plurality of hubs, each hub having a recess and a socket with a contracted neck between the recess and the socket and a complete closure on the outside of the socket, the contracted neck being fitted over a bolt with the end of the bolt projecting into the socket, and expansible holding detents on the bolt to engage the neck portion and prevent removal of said indicia bearing bar, such bar requiring breakage at the hubs for removal, and the bar when attached preventing disengagement of the bolts from the license plate.

5. In a device as claimed in claim 4, each hub having a recess with a spring mounted therein to bear against the license plate.

6. In a device as described, the combination of a supporting structure of a vehicle, a license plate, an indicia bearing bar, a plurality of holding devices having bolts connecting the supporting structure, the license plate, and said bar, and having hub structures with attachment means therein, said attachment means being inaccessible when the hub structures are secured to the bolts and necessitating breakage of the hub structures for removing said bar or the license plate.

7. In a device as described, the combination of a supporting structure of a vehicle, a license plate, a plurality of holding devices having bolts connecting the supporting structure and the plate, an indicia bearing bar, such bar having a plurality of hub structures formed integral therewith with attachment means therein for connection to the bolts, said attachment means being inaccessible when the hub structures are secured to the bolts in their operative position and necessitating breaking the hub structures for removal of the indicia bearing bar and the license plate.

8. In a device as described, the combination of a supporting structure of a vehicle, a license plate, a pair of bolts having means for securing the plate to said structure, an indicia bearing bar having hubs formed integral therewith with attachment means for interconnecting the hubs and the bolts, said attachment means being inaccessible when the hubs are secured to the bolts and necessitating breakage of the hub structure for removal of the indicia bearing bar and the license plate.

9. In a device as described in claim 8, the license plate having a license number and in addition a designation of the State or Territory issuing such plate and the name of the make of the car to which such license plate applies.

10. In a device as described in claim 8, the license plate having a license number and the name of the make of the car to which such plate applies.

11. In a device as described, the combination of a license plate for a vehicle having a license number together with the name of the make of such vehicle, a supporting structure on a vehicle, holding devices for connecting the license plate and said structure, an indicia bearing device having the current license year marked thereon, an attachment means for securing said indicia bearing device to said holding devices and the vehicle structure, means rendering said attachment means inaccessible when in operative position and requiring breakage of part of said rendering means for removal of the indicia bearing device and the license plate.

12. In a device as described, the combination of a license plate having a license number and the name of the make of a car, a plurality of bolts adapted for connecting the license plate to a structural part of a vehicle, an indicia bearing bar having marked thereon the current license year, connecting hubs having attachment means for connection to the bolts for securing said bar to the bolts, said attachment means being inaccessible when the hubs are connected to the bolts and necessitating breakage of said hubs for removal of the indicia bearing bar and the license plate.

13. In a device as described in claim 12, said indicia bearing bar being formed integral with the hubs, the bar and the hubs being formed of readily frangible material.

14. In a device as described, the combination of a license plate, a plurality of holder devices secured to the plate and adapted for attaching the plate to a supporting frame, an indicia bearing plate having a plurality of hubs each connected to one of the holder devices, said latter plate having indicia thereon to be used in combination with the license plate for identification, said connection of said hubs with the holder devices requiring breakage of said indicia bearing plate at the hubs for removal of said indicia bearing plate.

15. In a device as described, the combination of a supporting frame, a license plate, a plurality of holding devices, with means for securing the plate to the frame and for the removal thereof, an indicia bearing bar having a plurality of hubs, attachment means engaging the hubs for attaching the bar and the license plate, said hubs each having a construction requiring breakage for detachment of the bar, and the license plate and said attachment means being interoperative with said holding devices to prevent detachment of the license plate from the supporting frame without first breaking said hubs and detaching the bar.

16. In a device as described, the combination of a license plate, a plurality of bolt-like holding devices securable to the license plate and adapted for attachment to a supporting frame and for detachment therefrom, an indicia bearing bar having a plurality of frangible hubs, attaching means interconnecting each hub and one of the bolt-like holding devices, said attaching means when connected to the hubs preventing detachment of the holding devices from the license plate, and requiring breakage of said hubs for removal of said bar from the license plate for replacement.

17. In a device as claimed in claim 16, each hub having a socket with a reduced neck, and the attaching means fitting in the socket and having expanding means engaging the neck.

18. In a device as described, the combination of a supporting structure of a vehicle, a license plate, an indicia bearing device having a frangible part, holding means attaching both the license plate and the indicia bearing device to the supporting structure, said holding devices having an attachment means engaging the said frangible part, which attachment means is inaccessible when the supporting structure, the plate, and device are connected and requires breakage of said frangible part of the indicia bearing device for detachment of the plate and indicia bearing device from the supporting structure.

19. In a device as described, the combination of a supporting structure of a vehicle, a license plate, an indicia bearing structure having a frangible part, a holding device securing both the indicia bearing device and the license plate to the supporting structure, such holding device having an attachment means engaging said frangible part and which is inaccessible when in operative position and which necessitates breakage of said frangible part to remove either the indicia bearing structure or the license plate.

20. In a device as described, the combination of a supporting structure of a vehicle, a license plate, an indicia bearing bar having a plurality of frangible parts, a plurality of holding devices having each a first part connecting the license plate and the supporting structure, and a second part securing the indicia bearing bar to the first part of the respective holding device by engaging one of said frangible parts, said second parts of the holding devices being inaccessible when in operative position and necessitating breakage of said frangible parts for removal of either the indicia bearing bar or the license plate.

21. In a device as described, the combination of a supporting structure on a vehicle, a license plate, a plurality of holding devices connecting the license plate to the supporting structure, an indicia bearing bar, said bar and holding devices having an attachment means for attaching the bar and license plate, one portion of the attachment means of the holding devices being inaccessible when in operative position and requiring breakage of the other portion of the attachment means for removal of the indicia bearing bar from the license plate.

22. In a device as described, a license plate for fastening to a vehicle, an indicia bearing bar having a frangible hub, an attaching means interconnecting the hub and the license plate for holding the bar adjacent the plate, the hub having a construction requiring breakage for disconnecting the bar and the plate, the license plate and bar both having indicia thereon jointly for identification purposes.

23. In a device as described, an automobile license plate having thereon a license number, a designation of the State or Territory issuing such plate and the name of the make of the automobile to which said license plate applies, combined with an indicia bearing bar, means to attach the bar to the plate, and a securing means for securing the license plate to an automobile, said bar having means to render part of the securing means inaccessible when the bar is attached to the license plate, said securing means and license plate being removable one from the other only after detaching the bar from the license plate.

24. In a device as described, an automobile license plate having thereon a license number, a designation of the State or Territory issuing such plate, and the name of the make of the automobile to which said license plate applies, an attaching means for attaching the license plate to an automobile, an indicia bearing bar, means for securing said bar to the attaching means, said securing means having a structure to render part of said attaching means inaccessible when the bar is attached to the license plate, said securing means and the license plate being removable one from the other only after detaching said bar from the license plate.

HARRISON GRAHAM WILLIAMS.